US012509931B2

(12) United States Patent
Kanai

(10) Patent No.: US 12,509,931 B2
(45) Date of Patent: Dec. 30, 2025

(54) WINDOW REGULATOR AND STOPPER MEMBER ATTACHING METHOD

(71) Applicant: Johnan Manufacturing Inc., Nagano (JP)

(72) Inventor: Hideaki Kanai, Nagano (JP)

(73) Assignee: JOHNAN MANUFACTURING INC., Nagano (JP)

(*) Notice: Subject to any disclaimer, the term of this patent is extended or adjusted under 35 U.S.C. 154(b) by 0 days.

(21) Appl. No.: 18/500,570

(22) Filed: Nov. 2, 2023

(65) Prior Publication Data

US 2024/0209668 A1 Jun. 27, 2024

(30) Foreign Application Priority Data

Dec. 26, 2022 (JP) ................................ 2022-208360

(51) Int. Cl.
*E05D 15/16* (2006.01)
*E05F 15/689* (2015.01)

(52) U.S. Cl.
CPC .......... *E05D 15/165* (2013.01); *E05F 15/689* (2015.01); *E05Y 2201/224* (2013.01); *E05Y 2201/64* (2013.01); *E05Y 2201/654* (2013.01); *E05Y 2201/684* (2013.01); *E05Y 2600/456* (2013.01); *E05Y 2600/53* (2013.01); *E05Y 2900/55* (2013.01)

(58) Field of Classification Search
CPC ................ E05D 15/165; E05D 15/689; E05Y 2201/224; E05Y 2201/64; E05Y 2201/654; E05Y 2201/684; E05Y 2600/456; E05Y 2600/53; E05Y 2900/55; E05F 11/486
USPC .......................................................... 49/352
See application file for complete search history.

(56) References Cited

U.S. PATENT DOCUMENTS 4,608,778 A * 9/1986 Shiraishi ............... E05F 11/488 49/352
4,823,512 A * 4/1989 Maekawa ............. E05F 11/485 49/352
5,461,826 A * 10/1995 Heckel .................... E05F 15/41 49/352
5,595,025 A * 1/1997 MacPhail-Fausey ........................ E05F 15/689 49/351
5,950,365 A * 9/1999 Lieb ........................... B60J 1/17 49/352
7,765,739 B2 * 8/2010 Munezane ............ E05F 11/483 49/352

(Continued)

FOREIGN PATENT DOCUMENTS

JP 2019-203272 A 11/2019

*Primary Examiner* — Marcus Menezes
(74) *Attorney, Agent, or Firm* — Calderon Safran & Wright P.C.; David S. Safran

(57) ABSTRACT

A window regulator includes a guide rail provided along an ascending/descending direction of a window glass of a vehicle, a carrier plate that slides on the guide rail and moves together with the window glass, a wire that is routed on one side of the guide rail and pulls the carrier plate, and a stopper member that is attached on the one side of the guide rail so as to overlap a routing position of the wire and restricts movement of the carrier plate in the ascending/descending direction. The stopper member includes an attachment portion to attach the stopper member to the guide rail from the one side, and a bypass portion that bypasses the routing position of the wire on a side opposite to the guide rail.

7 Claims, 10 Drawing Sheets

(56) References Cited

U.S. PATENT DOCUMENTS

| | | | | |
|---|---|---|---|---|
| 8,720,114 | B2 * | 5/2014 | Matsushita | E05F 5/06 49/352 |
| 8,826,595 | B2 * | 9/2014 | Nakamura | E05F 11/426 49/350 |
| 9,163,448 | B2 * | 10/2015 | Imaoka | E05F 15/689 |
| 10,975,606 | B2 * | 4/2021 | Kashiwabara | E05F 11/486 |
| 11,326,381 | B2 * | 5/2022 | Tanaka | E05F 15/686 |
| 11,788,336 | B2 * | 10/2023 | Kashiwagi | E05F 15/689 49/352 |
| 2004/0154227 | A1 * | 8/2004 | Yoshimura | E05F 11/488 49/352 |
| 2007/0144073 | A1 * | 6/2007 | Munezane | E05F 11/486 49/349 |
| 2007/0251148 | A1 * | 11/2007 | Watson | E05F 15/689 49/352 |
| 2014/0007507 | A1 * | 1/2014 | Umemura | E05F 11/481 49/349 |
| 2017/0167177 | A1 * | 6/2017 | Shimizu | E05F 11/483 |
| 2024/0209668 | A1 * | 6/2024 | Kanai | E05D 15/165 |

* cited by examiner

WINDOW REGULATOR AND STOPPER MEMBER ATTACHING METHOD

CROSS-REFERENCE TO RELATED APPLICATIONS

The present patent application claims the priority of Japanese patent application No. 2022/208360 filed on Dec. 26, 2022, and the entire contents of Japanese patent application No. 2022/208360 are hereby incorporated by reference.

TECHNICAL FIELD

The present invention relates to a window regulator and a stopper member attaching method.

BACKGROUND ART

A window regulator is known in which movement of a carrier plate in a descending direction is restricted by a stopper member attached to a guide rail (see Patent Literature 1). This window regulator includes the guide rail provided along an ascending/descending direction of a vehicle window glass, a carrier plate sliding on the guide rail and moving together with the window glass, a wire (a descending-side cable) to pull the carrier plate, and the stopper member that is attached to the guide rail and restricts the carrier plate from moving in the descending direction.

CITATION LIST

Patent Literatures

Patent Literature 1: JP 2019/203272 A

SUMMARY OF INVENTION

When the known wind regulator is assembled such that the stopper member is attached to the guide rail with the wire routed, it is necessary to lift the wire, insert the stopper member between the lifted wire and the guide rail, and attach the stopper member. Therefore, it is complicated to attach the stopper member.

It is an object of the invention to provide a window regulator and a stopper member attaching method that allow for easy attachment of a stopper member.

An aspect of the invention provides a window regulator, comprising:

- a guide rail provided along an ascending/descending direction of a window glass of a vehicle;
- a carrier plate that slides on the guide rail and moves together with the window glass;
- a wire that is routed on one side of the guide rail and pulls the carrier plate; and
- a stopper member that is attached on the one side of the guide rail so as to overlap a routing position of the wire and restricts movement of the carrier plate in the ascending/descending direction,
- wherein the stopper member comprises an attachment portion to attach the stopper member to the guide rail from the one side, and a bypass portion that bypasses the routing position of the wire on a side opposite to the guide rail.

Also, another aspect of the invention provides a stopper member attaching method for attaching the stopper member to the guide rail in the window regulator described above, the method comprising:

- attaching the stopper member to the guide rail from the one side of the guide rail by means of the attachment portion.

Advantageous Effects of Invention

According to an embodiment of the invention, the window regulator and the stopper member attaching method can be provided that allow for easy attachment of a stopper member.

DESCRIPTION OF EMBODIMENTS

A window regulator and a stopper member attaching method in an embodiment of the invention will be described below in reference to the appended drawings. This window regulator is a raising/lowering device that is installed in a vehicle door provided on a vehicle (e.g., an automobile) and raises/lowers a window glass on the vehicle door. In particular, this wind regulator employs an attachment structure that allows for easy attachment of the stopper member to the guide rail even in a state in which the wire is routed. Hereinafter, an ascending/descending direction of the window glass of the vehicle will be simply referred to as the ascending/descending direction. In addition, left, right, front, back, up and down used in the following description are as defined in each drawing. In the present embodiment, the ascending/descending direction coincides with the up-down direction of the window regulator, and a vehicle width direction coincides with a front-back direction of the window regulator. In addition, a direction orthogonal to the ascending/descending direction and the vehicle width direction is a left-right direction of the window regulator.

(Configuration of the Window Regulator)

Figure 1:
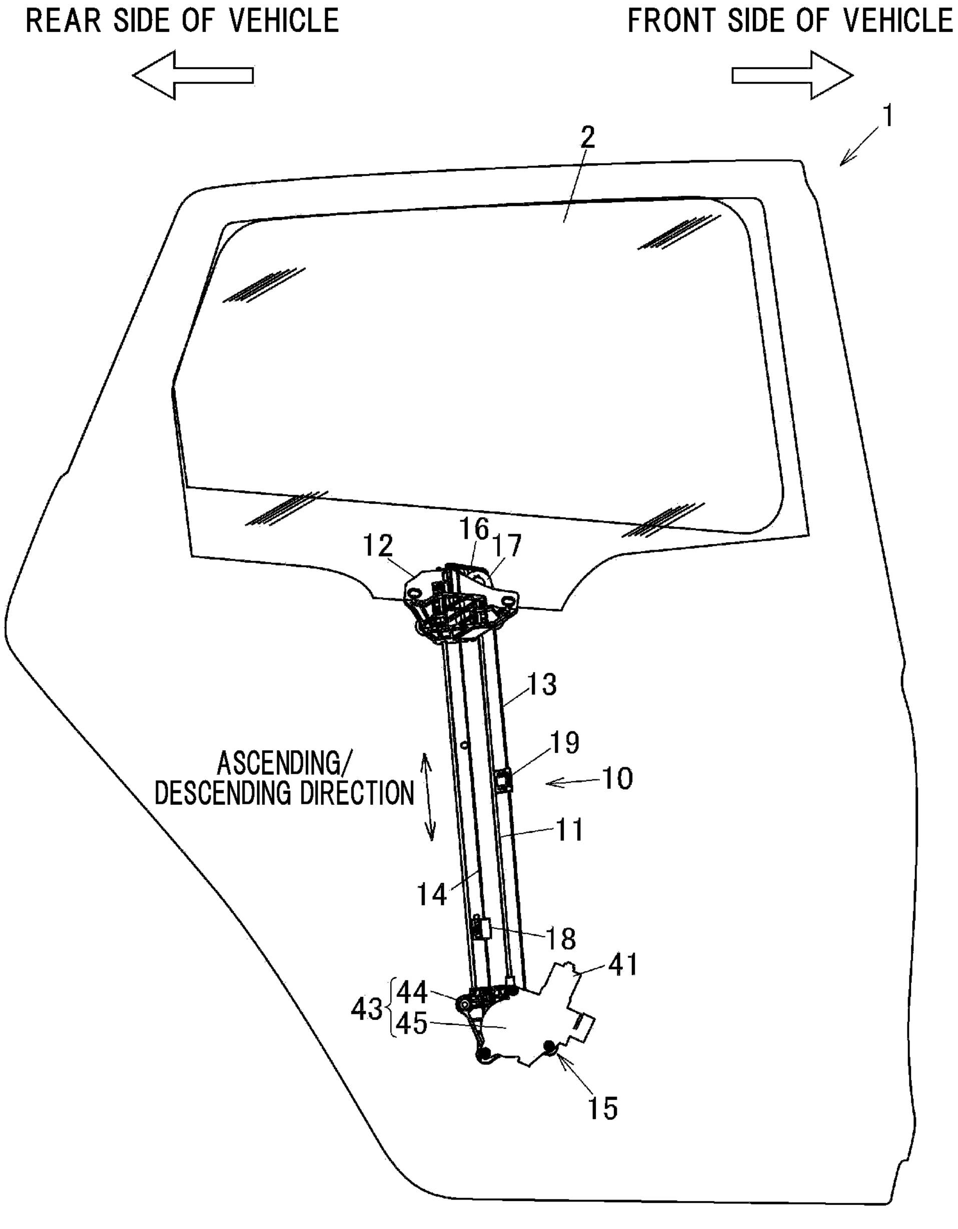
FIG. 1 is a general schematic diagram illustrating a window regulator in an embodiment of the present invention and a vehicle door in which the window regulator is installed.
Figure 2A:
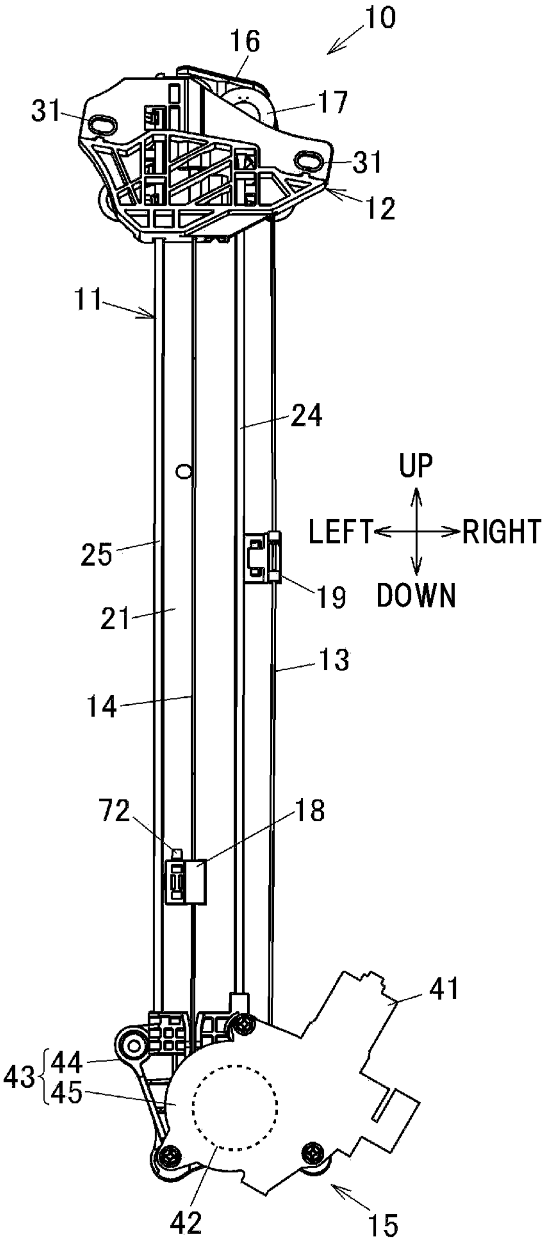
FIG. 2A is a front view showing the window regulator when a window glass is fully closed.
Figure 2B:
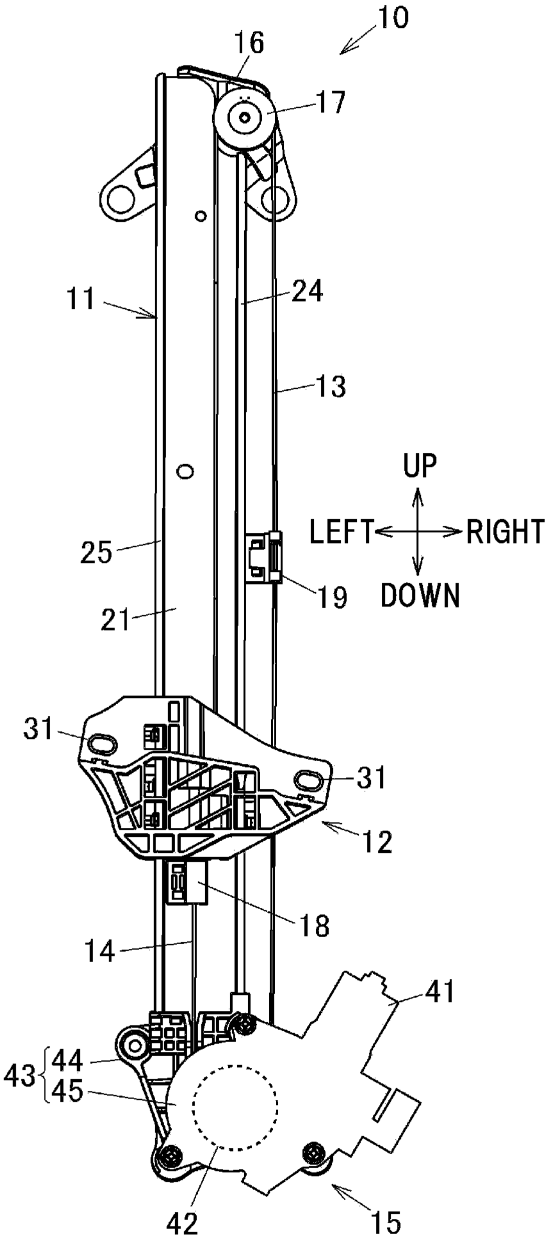
FIG. 2B is a front view showing the window regulator when the window glass is fully open.

As shown in FIGS. 1 and 2, a window regulator 10 is installed in a vehicle door 1 and includes a guide rail 11 provided along the ascending/descending direction, a carrier plate 12 that supports a window glass 2, slides on the guide rail 11 and moves together with the window glass 2, and an ascending-side wire 13 and a descending-side wire 14 that pull the carrier plate 12.

The window regulator 10 also includes a drive unit 15 arranged at a lower end of the guide rail 11 to drive the ascending-side wire 13 and the descending-side wire 14, a pulley 17 arranged at an upper end of the guide rail 11 through a pulley bracket 16 to change the direction of the ascending-side wire 13, a stopper member 18 that is attached to the guide rail 11 above the drive unit 15 and restricts downward movement of the carrier plate 12 in the ascending/descending direction, and a wire support member 19 attached to a longitudinal middle portion of the guide rail 11 to support the ascending-side wire 13 routed between the drive unit 15 and the pulley 17. That is, this window regulator 10 is a wire driving-type window regulator to raise and lower the carrier plate 12 using the wires 13, 14 and is also a lower end drive-type window regulator having the drive unit 15 arranged at the lower end of the guide rail 11.

The guide rail 11 is a long metal member extending along the ascending/descending direction and is arranged so as to tilt to the rear side in a vehicle front-rear direction with respect to the vehicle door 1 as shown in FIG. 1. The guide rail 11 is also curved so as to bulge toward the outside of a vehicle cabin in the vehicle width direction.

Figure 3A:
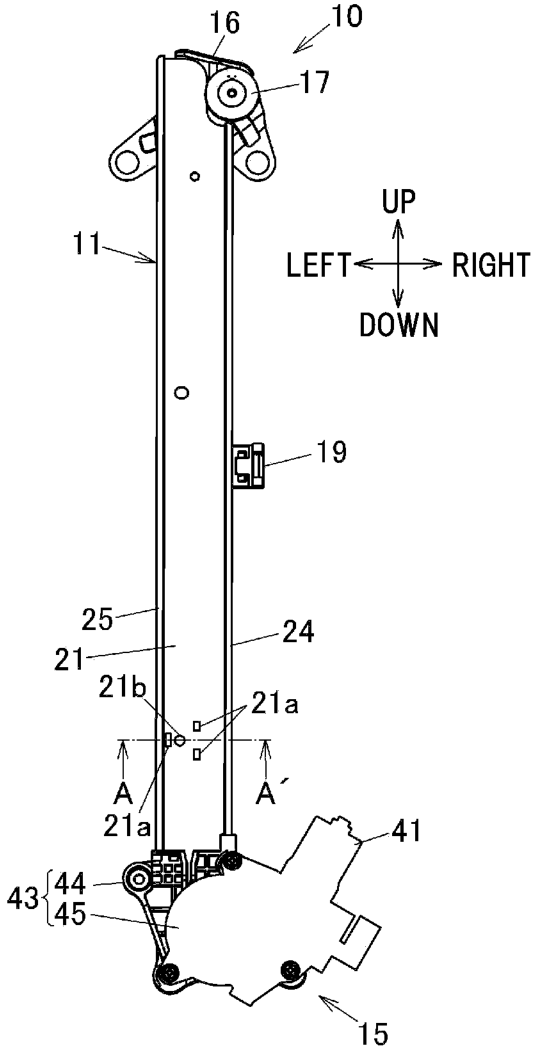
FIG. 3A is a front view showing the window regulator without a carrier plate, an ascending-side wire, a descending-side wire and a stopper member.
Figure 3B:
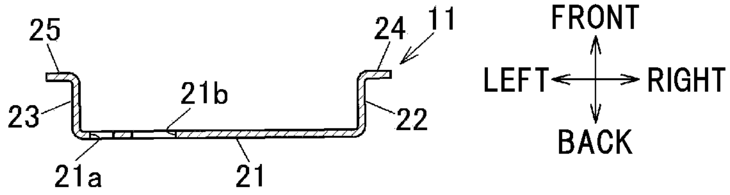
FIG. 3B is a cross-sectional view showing a guide rail taking along line A-A' in FIG. 3A.
Figure 4A:
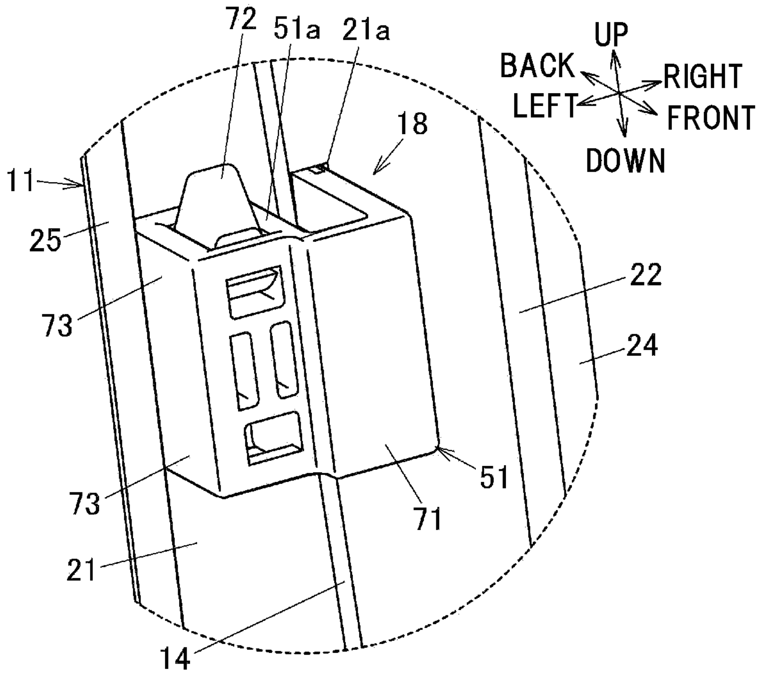
FIG. 4A is a front perspective view showing a portion around the stopper member.
Figure 4B:
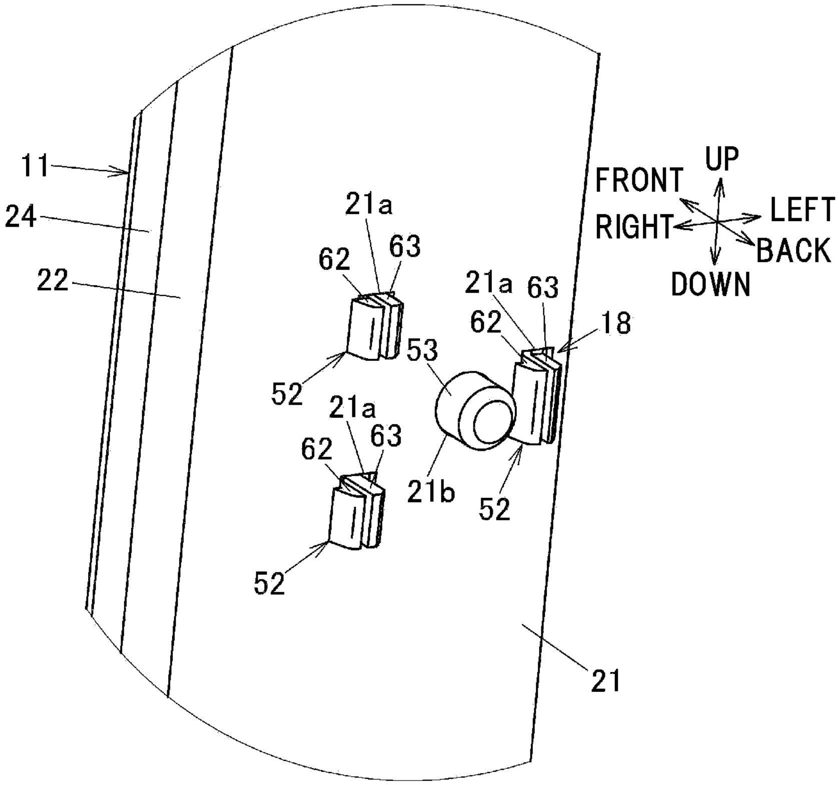
FIG. 4B is a back perspective view showing a portion around the stopper member.

As shown in FIG. 3, the guide rail 11 integrally has a flat plate portion 21 extending in the ascending/descending direction, a pair of side plate portions 22, 23 that rise toward the front from left and right ends of the flat plate portion 21, and a pair of flange portions 24, 25 protruding outward in the left-right direction from respective front ends of the plate portions 22, 23.

Three attachment holes 21*a* for attachment of the stopper member 18 and a circular hole 21*b* are formed on a lower portion of the flat plate portion 21. The three attachment holes 21*a* have a rectangular shape, two of the three attachment holes 21*a* are formed so as to be vertically aligned at the center of the flat plate portion 21, and one of the three attachment holes 21*a* is formed at the left end of the flat plate portion 21 in the left-right direction. The circular hole 21*b* is formed between the attachment holes 21*a* at the right end and the attachment hole 21*a* at the center.

As shown in FIG. 2, the carrier plate 12 is a plate-shaped member formed of, e.g., a resin such as polyacetal, is slidably supported by the left side plate portion 23 of the guide rail 11 and is arranged on a front side of the guide rail 11. The carrier plate 12 also has two left and right fastening holes 31, 31 for attachment of the window glass 2. The fastening holes 31, 31 are for bolt-fastening of glass holders (not shown) fixed to the window glass 2. By fastening the glass holders into the fastening holes 31, 31 with bolts, the window glass 2 is attached to the carrier plate 12 through the glass holders.

The ascending-side wire 13 is connected at one end to a rotating drum 42 (described later) of the drive unit 15, is fed upward from the drive unit 15 to the pulley 17, is redirected downward by the pulley 17, and is then attached at the other end to the carrier plate 12. The ascending-side wire 13 routed between the rotating drum 42 and the pulley 17 is located off the guide rail 11, whereas the ascending-side wire 13 routed between the pulley 17 and the carrier plate 12 is located on the guide rail 11.

The descending-side wire 14 is connected at one end to the rotating drum 42 of the drive unit 15, is fed upward from the drive unit 15, and is attached at the other end to the carrier plate 12. The descending-side wire 14 routed between the rotating drum 42 and the carrier plate 12 is located on the guide rail 11. That is, the descending-side wire 14 is routed on the front side (on the one side) of the guide rail 11.

The drive unit 15 has a driving motor 41 equipped with a reducer and capable of forward and reverse rotation, the rotating drum 42 rotationally driven by the driving motor 41, and a housing 43 that houses the rotating drum 42 and also holds the driving motor 41. The housing 43 has a drum housing 44, to which the lower end of the guide rail 11 is fitted and which rotatably houses the rotating drum 42, and a motor housing 45 holding the driving motor 41.

When the driving motor 41 rotates forward, the rotating drum 42 rotates forward and takes up the ascending-side wire 13 while feeding out the descending-side wire 14. Thus, the carrier plate 12 is pulled by the ascending-side wire 13 and moves upward in the ascending/descending direction. As a result, the window glass 2 attached to the carrier plate 12 ascends (raising operation of the window glass 2). On the other hand, when the driving motor 41 rotates reverse, the rotating drum 42 rotates reverse and takes up the descending-side wire 14 while feeding out the ascending-side wire 13. Thus, the carrier plate 12 is pulled by the descending-side wire 14 and moves downward in the ascending/descending direction. As a result, the window glass 2 attached to the carrier plate 12 descends (lowering operation of the window glass 2). In this manner, the carrier plate 12 and the window glass 2 are raised and lowered along the guide rail 11.

(Configuration of the Stopper Member)

Next, the stopper member 18 will be described in reference to FIGS. 4 to 7. As shown in FIGS. 4 to 7, the stopper member 18 is formed of, e.g., a resin such as polyacetal, is attached on the front side of the guide rail 11 so as to overlap the descending-side wire 14 as viewed from the front side, and restricts downward movement of the carrier plate 12 in the ascending/descending direction. The stopper member 18 integrally has a stopper main body 51 arranged on the front surface of the flat plate portion 21 of the guide rail 11, three attachment portions 52 that are formed to protrude backward from the stopper main body 51 and engage with the three attachment holes 21*a*, a columnar engaging portion 53 that is formed to protrude backward from the stopper main body 51 and engages with the circular hole 21*b*, and a contact portion 54 in contact with the front surface of the flat plate portion 21 of the guide rail 11.

The three attachment portions 52 are arranged so as to sandwich a routing position 14*a* of the descending-side wire 14 in the left-right direction. Each attachment portion 52 has a snap-fit attachment structure, and includes a base portion 61 extending backward from the stopper main body 51, a right-facing claw portion 62 formed at an end of the body portion 61, and a receiving plate portion 63 having a plate shape and arranged behind (left side) the claw portion 62 to receive the claw portion 62.

The claw portion 62 of each attachment portion 52 has an inclined surface with which a right inner edge of the attachment hole 21*a* comes into contact when the claw portion 62 is pressed against the attachment hole 21*a*. When the claw portion 62 is pressed against the attachment hole 21*a*, the base portion 61 or the claw portion 62 is deformed to the left due to the contact between the inclined surface and the right inner edge of the attachment hole 21*a*, allowing the claw portion 62 to pass through the attachment hole 21*a*. Then, once the claw portion 62 passes through the attachment hole 21*a*, the deformed base portion 61 or claw portion 62 returns to its original shape, this causes the front surface of the claw portion 62 to engage with the back surface of the flat plate portion 21, and the attachment hole 21*a* and the attachment portion 52 engage with each other. In this way, the attachment portion 52 is attached to the attachment hole 21*a* from the front side (the one side) of the guide rail 11 and is fixed to the attachment hole 21*a* in a snap-fit manner. The stopper member 18 is attached to the guide rail 11 from the front side of the guide rail 11 in a snap-fit manner by means of the three attachment portions 52.

When the base portion 61 or the claw portion 62 is deformed at the time of attaching the stopper member 18, the receiving plate portion 63 of each attachment portion 52 receives the claw portion 62 and restricts the deformation.

The columnar engaging portion 53 engages with the circular hole 21*b* of the flat plate portion 21. The columnar engaging portion 53 is arranged substantially at the center of the stopper member 18 and serves to transmit stress from the carrier plate 12 to the guide rail 11 by engagement with the circular hole 21*b* and make the guide rail 11 receive the stress.

The contact portion 54 is arranged between the two attachment portions 52 on the right side and is in contact with the front surface of the flat plate portion 21 of the guide rail 11. This contact of the contact portion 54 suppresses rattling of the stopper member 18 against the guide rail 11.

Figure 5A:
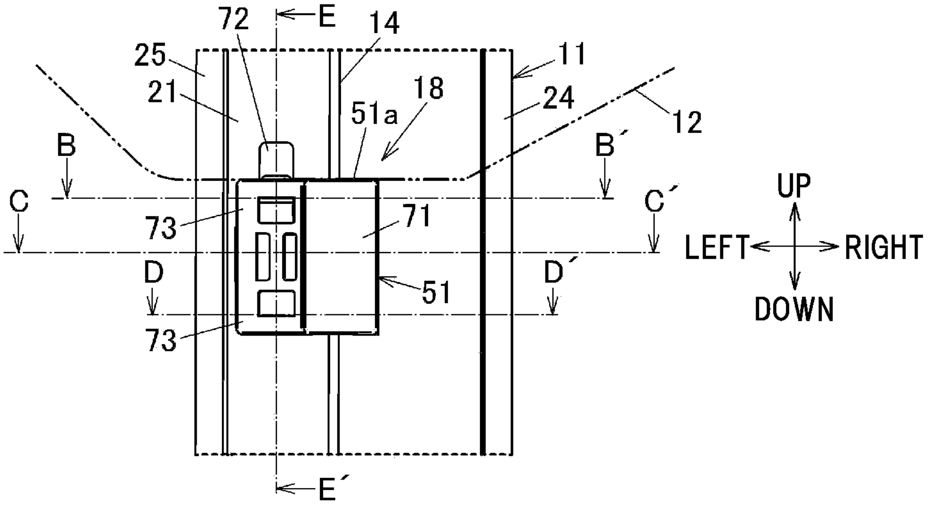
FIG. 5A is a front view showing a portion around the stopper member.
Figure 5B:
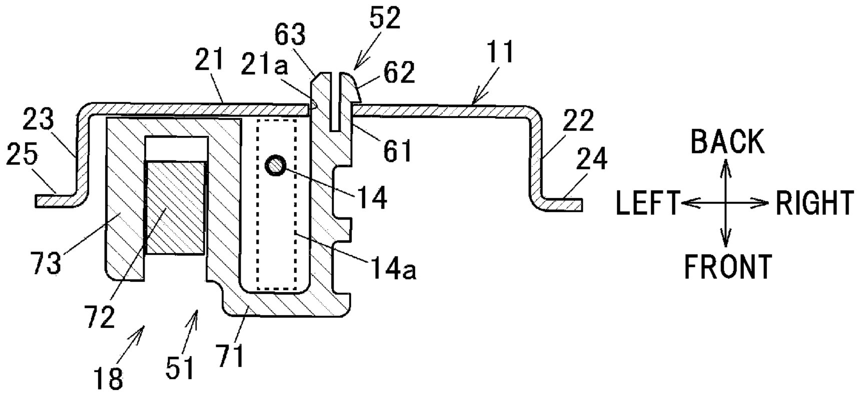
FIG. 5B is an end view showing a portion around the stopper member along line B-B' in FIG. 5A.
Figure 5C:
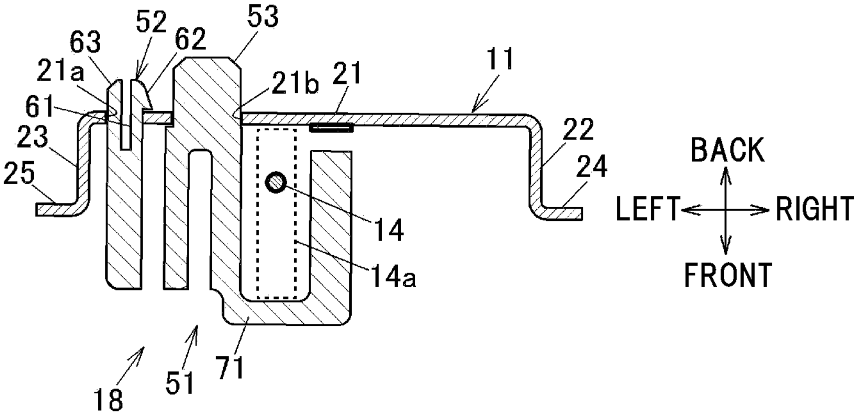
FIG. 5C is an end view showing a portion around the stopper member along line C-C' in FIG. 5A.
Figure 6A:
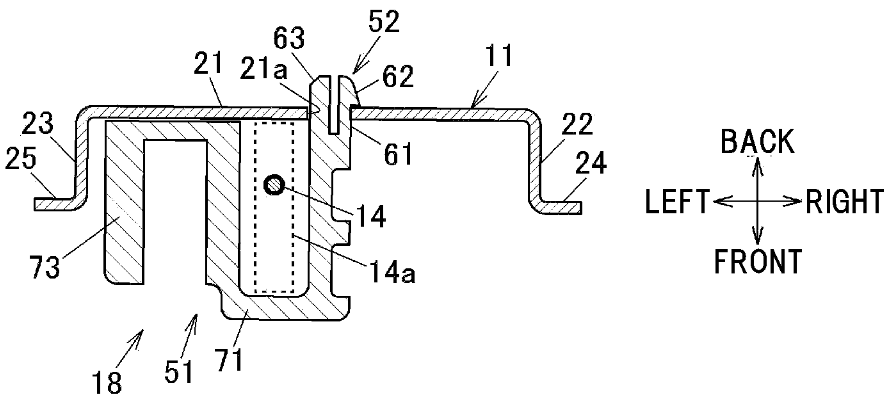
FIG. 6A is an end view showing a portion around the stopper member along line D-D' in FIG. 5A.
Figure 6B:
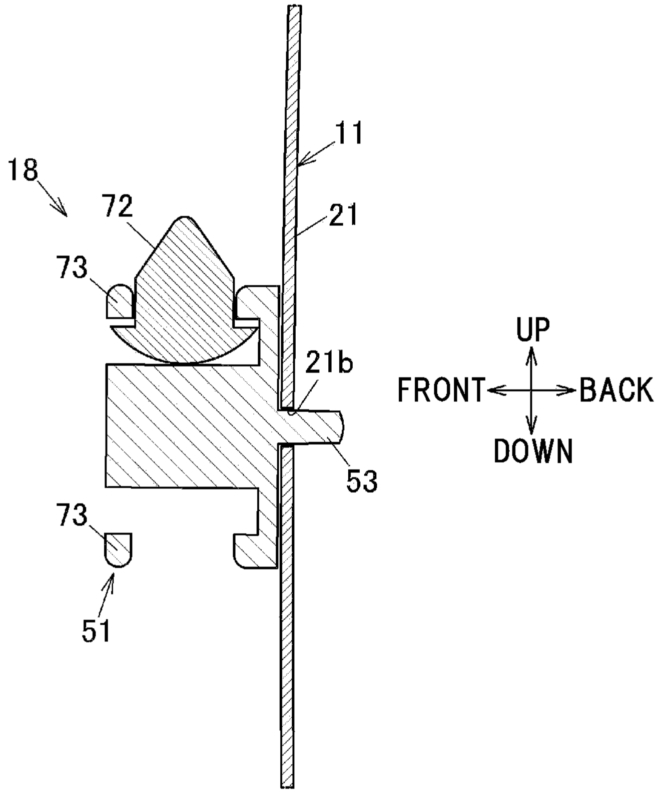
FIG. 6B is an end view showing a portion around the stopper member along line E-E' in FIG. 5A.
Figure 7A:
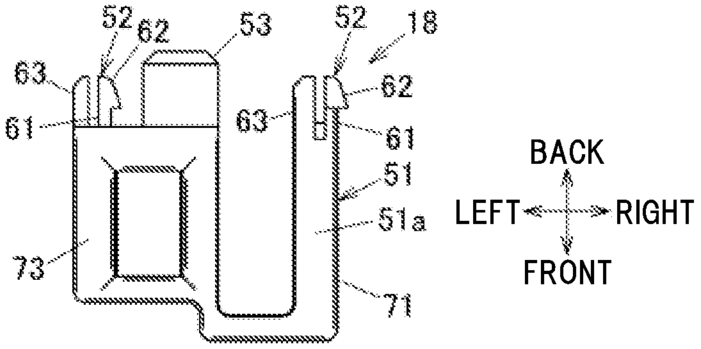
FIG. 7A is a plan view showing the stopper member.
Figure 7B:
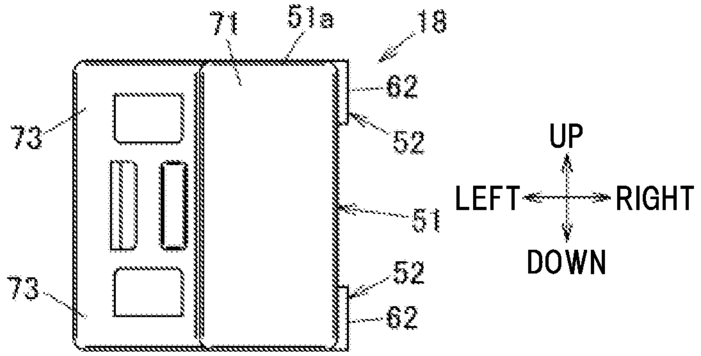
FIG. 7B is a front view showing the stopper member.
Figure 7C:
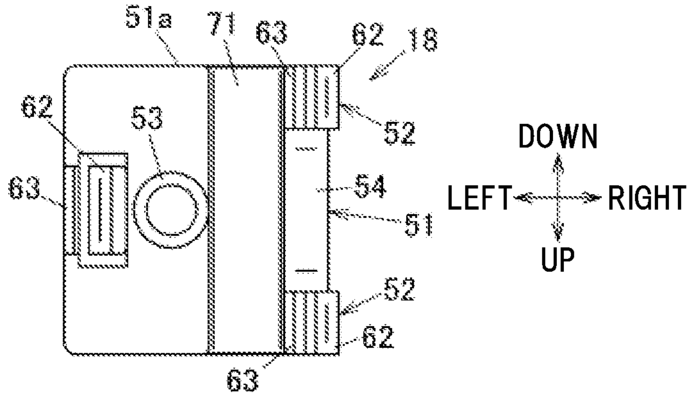
FIG. 7C is a back view showing the stopper member.
Figure 7D:
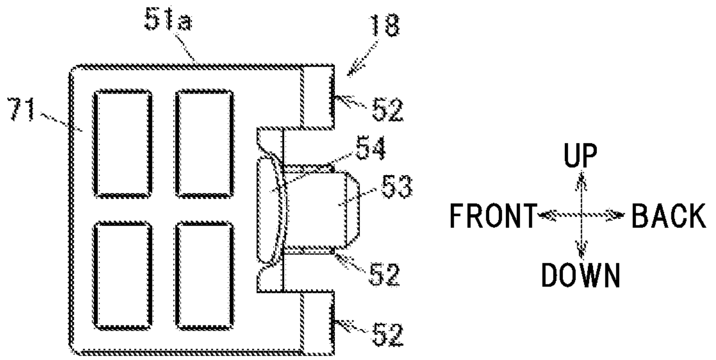
FIG. 7D is a right side view showing the stopper member.

The stopper main body 51 is arranged on the guide rail 11 so as to overlap the descending-side wire 14. An upper surface 51*a* of the stopper main body 51 serves as a stopper surface that restricts the downward movement of the carrier plate 12 in the ascending/descending direction. When fully opening the window glass 2 by the lowering operation of the window glass 2, a lower surface of the carrier plate 12 comes into contact with the upper surface 51*a* of the stopper main body 51 as shown in FIG. 5A and the carrier plate 12 is restricted from moving further downward in the ascending/descending direction. This defines the lower limit position of the movement stroke of the carrier plate 12.

In addition, a bypass portion 71, which bypasses the routing position 14*a* of the descending-side wire 14 in a "U" shape on a side opposite to the guide rail 11 to avoid contact therewith, is formed on a right portion of the stopper main body 51. Due to having the bypass portion 71, the upper surface 51*a* (the stopper surface) of the stopper main body 51 is formed to surround the routing position 14*a* of the descending-side wire 14, except for the guide rail 11 side. By providing the stopper main body 51 around the descending-side wire 14 in this manner, it is possible to accurately restrict the carrier plate 12 which moves by being pulled by the descending-side wire 14. In this regard, the descending-side wire 14 moves in the front-back direction as the carrier plate 12 moves. Therefore, taking this into consideration, the bypass portion 71 is formed so that the descending-side wire 14 does not come into contact with the stopper main body 51 even when the descending-side wire 14 moves toward the front side to the maximum extent.

In addition, a shock absorbing member mounting portion 73 to mount a shock absorbing member 72 is formed on a left portion of the stopper main body 51. The shock absorbing member 72 is composed of an elastic body and cushions the shock when the carrier plate 12 comes into contact with the upper surface 51*a* of the stopper main body 51. It is preferable that two shock absorbing member mounting portions 73, one above and the other below in the ascending/descending direction, be formed on the stopper main body 51 so that the stopper member 18 can be applied to both left and right vehicle doors 1 by flipping upside down.

By providing the stopper member 18 which is attached to the guide rail 11 as described above, the drive unit 15 can be positioned out of alignment with the lower limit position of the movement stroke of the carrier plate 12. This allows a space for arranging other parts of the vehicle door 1 to be created above the drive unit 15. In addition, the position of the driving unit 15, which is a heavy part, can be shifted to any position on the vehicle door 1 and can be, e.g., out of alignment with a position where an occupant's body (thigh, etc.) is located.

(Attachment Operation of the Stopper Member)

Here, an attachment operation of the stopper member 18 to attach the stopper member 18 to the guide rail 11 will be described in reference to FIG. 8. This attachment operation of the stopper member 18 is performed in a state in which components other than the stopper member 18, the driving motor 41 and the motor housing 45 are attached to the guide rail 11. In particular, in the assembly operation of the window regulator 10, after one end of the ascending-side wire 13 and one end of the descending-side wire 14 are attached to the rotating drum 42, the rotating drum 42 is attached to the drum housing 44 and the other ends of the ascending-side wire 13 and the descending-side wire 14 are then attached to the carrier plate 12. Then, after attaching the drum housing 44 and the carrier plate 12 to the guide rail 11, the pulley bracket 16 and the pulley 17 are attached to the guide rail 11 while looping the ascending-side wire 13 over the pulley 17. The attachment operation of the stopper member 18 is performed in this state. Then, after the attachment operation of the stopper member 18, the motor housing 45 incorporating the driving motor 41 is attached to the drum housing 44, thereby completing the assembly operation of the window regulator 10. The attachment operation of the stopper member 18 is an example of the method for attaching the stopper member 18.

Figure 8A:
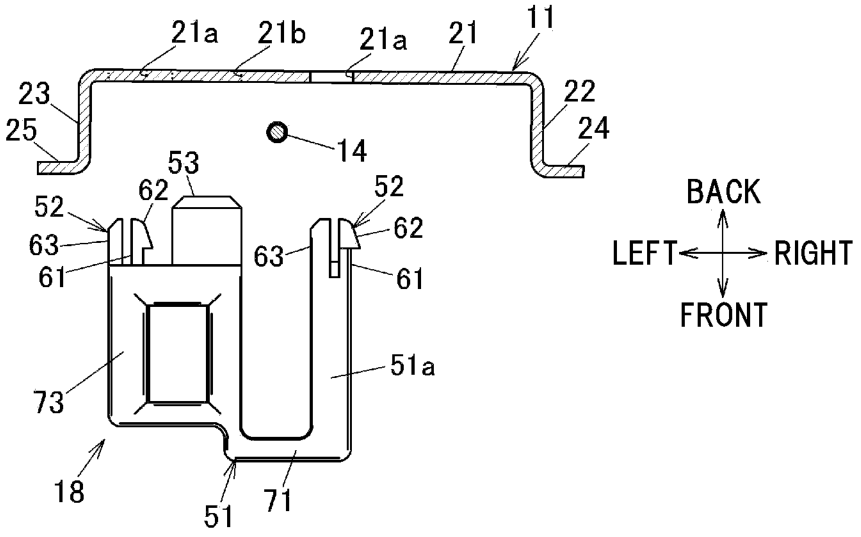
FIGS. 8A and 8B show explanatory diagrams illustrating an attachment operation of the stopper member.
Figure 8B:
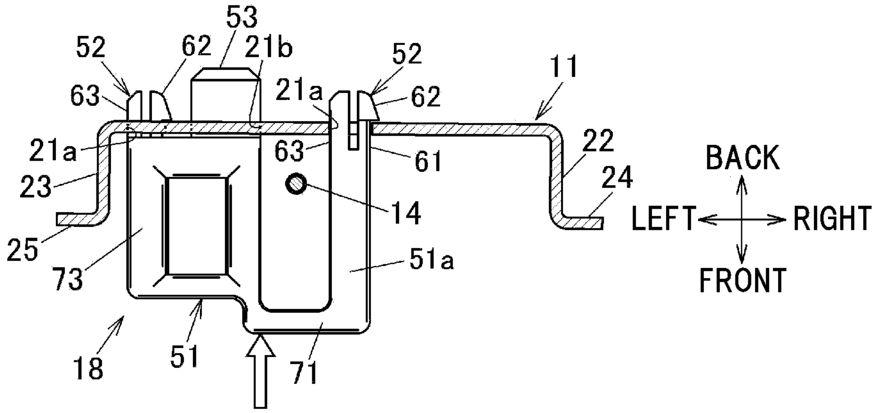

In the attachment operation of the stopper member 18, the stopper member 18 is arranged on the front side of the guide rail 11 and positioned with respect to the guide rail 11 so that the positions of the three attachment portions 52 and the columnar engaging portion 53 are aligned with the positions of the three attachment holes 21*a* and the circular hole 21*b* as shown in FIG. 8A. After that, the stopper member 18 is pressed against the guide rail 11 from the front side of the guide rail 11 as shown in FIG. 8B. As a result, the three attachment portions 52 are pressed into the three attachment holes 21*a* and are fixed to the three attachment holes 21*a* in a snap-fit manner, and the columnar engaging portion 53 engages with the circular hole 21*b*. In this way, the stopper member 18 is attached to the guide rail 11 from the front side of the guide rail 11 in a snap-fit manner.

(Functions and Effects of the Embodiment)

In the configuration of the embodiment described above, since the stopper member 18 includes the bypass portion 71 which bypasses the descending-side wire 14 routed on the guide rail 11 on the side opposite to the guide rail 11, the stopper member 18 can be attached to the guide rail 11 without lifting the descending-side wire 14 and inserting the stopper member 18 between the descending-side wire 14 and the guide rail 11. Thus, it is possible to easily attach the stopper member 18 even in the state in which the descending-side wire 14 is routed on the guide rail 11. As a result, the processing time for assembly of the window regulator 10 can be reduced and the manufacturing cost of the window regulator 10 can be reduced.

In addition, by arranging the stopper member 18 on the guide rail 11 so as to overlap the descending-side wire 14, the movement of the carrier plate 12 can be restricted near the descending-side wire 14, allowing the movement of the carrier plate 12 to be restricted accurately.

In addition, by arranging the three attachment portions 52 so as to sandwich the routing position 14*a* of the descending-side wire 14 in the left-right direction, it is possible to improve rigidity of the stopper member 18 against the contact with the carrier plate 12.

In addition, since the stopper member 18 can be attached to the guide rail 11 in a snap-fit manner, attachment of the stopper member 18 to the guide rail 11 can be performed with one-touch action by simply pressing the stopper member 18 against the guide rail 11, making it easier to attach the stopper member 18.

Other Embodiments

Although the embodiment of the invention has been described, the invention is not intended to be limited to the embodiment. Further, please note that not all combinations of the features described in the embodiment are necessary to solve the problem of the invention. The invention can be appropriately modified and implemented without departing from the gist thereof.

Figure 9A:
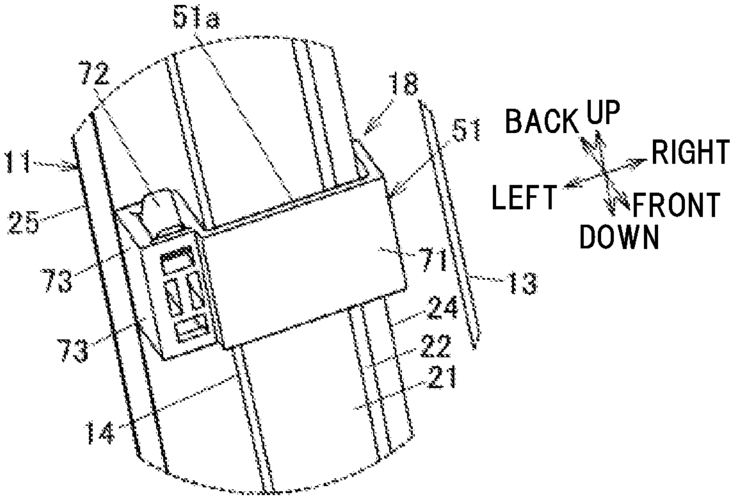
FIG. 9A is a front perspective view showing a portion around the stopper member in the first modification.
Figure 9B:
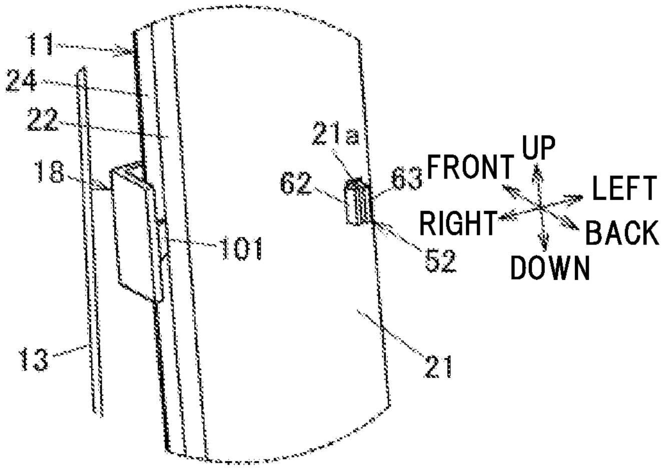
FIG. 9B is a back perspective view showing a portion around the stopper member in the first modification.
Figure 9C:
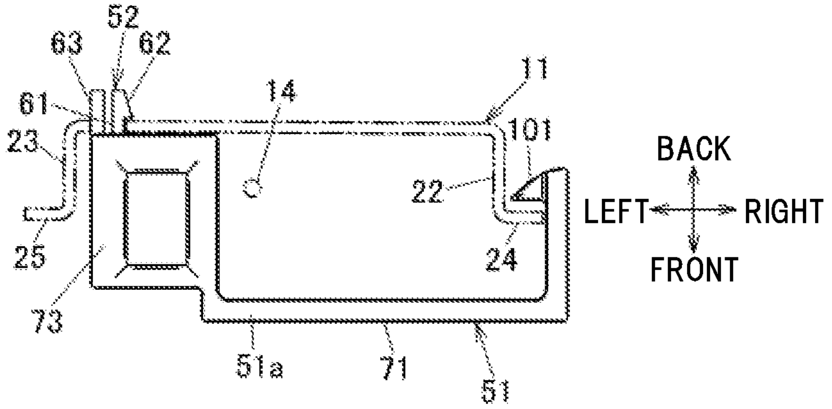
FIG. 9C is a plan view showing the stopper member in the first modification.

For example, although the stopper member 18 is attached to the guide rail 11 by the three attachment portions 52 in the embodiment described above, the configuration may be such that an attachment claw 101 engaging with the right flange portion 24 of the guide rail 11 is provided instead of the two attachment portions 52 on the right and the stopper member 18 is attached to the guide rail 11 by the one attachment portion 52 on the left and the attachment claw 101, as shown in FIG. 9.

Figure 10A:
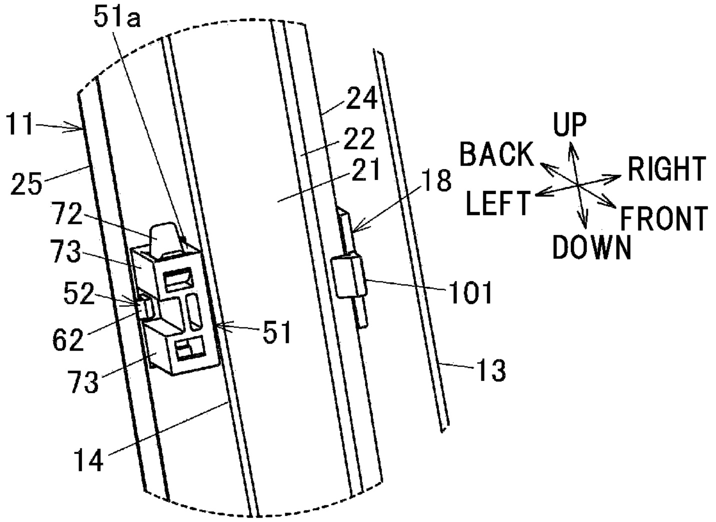
FIG. 10A is a front perspective view showing a portion around the stopper member in the second modification.
Figure 10B:
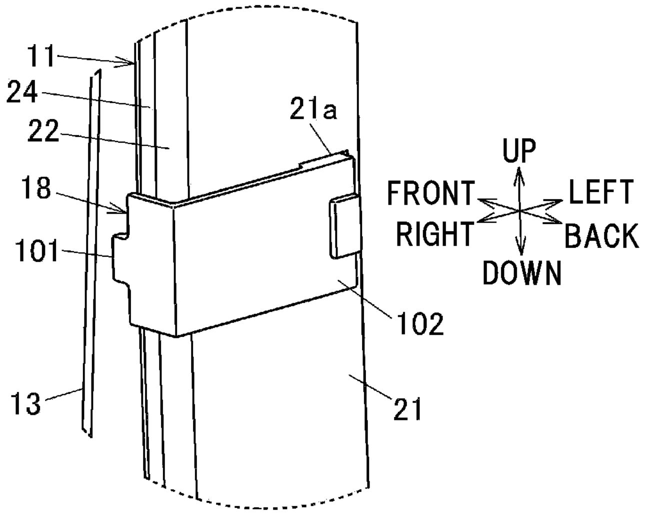
FIG. 10B is a back perspective view showing a portion around the stopper member in the second modification.
Figure 10C:
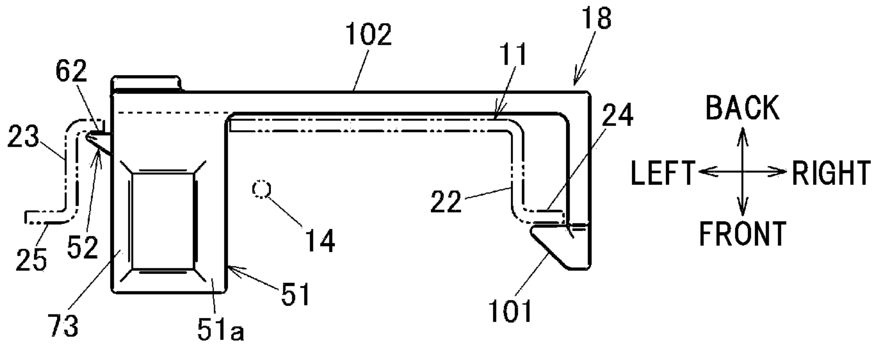
FIG. 10C is a plan view showing the stopper member in the second modification.

In addition, the stopper member 18 is attached to the guide rail 11 from the front side of the guide rail 11 in the embodiment described above, but when taking into consideration only ease of attachment of the stopper member 18, the stopper member 18 may be configured to be attached to the guide rail 11 from the back side of the guide rail 11. For example, as shown in FIG. 10, the stopper member 18 has a stopper base portion 102 arranged to face the back surface of the guide rail 11, and the stopper main body 51 and the attachment portion 52 are formed to protrude toward the front from the stopper base portion 102. In such a case, the stopper main body 51 passes through the attachment hole 21*a* and is exposed on the front side of the guide rail 11, and the upper surface 51*a* of the exposed portion comes into contact with the lower surface of the carrier plate 12 and restricts the movement of the carrier plate 12.

In addition, although the stopper member 18 is arranged on the lower portion of the guide rail 11 and serves as a lower limit stopper to restrict the downward movement of the carrier plate 12 in the ascending/descending direction in the embodiment described above, the stopper member 18 may be arranged on the upper portion of the guide rail 11 and serve as an upper limit stopper to restrict upward movement of the carrier plate 12 in the ascending/descending direction.

In addition, although the shock absorbing member mounting portion 73 to mount the shock absorbing member 72 is provided on the stopper member 18 in the embodiment described above, the shock absorbing member mounting portion 73 on the stopper member 18 may be omitted. In such a case, the configuration may be such that, e.g., the shock absorbing member mounting portion 73 is provided on the carrier plate 12 and the shock absorbing member 72 in the shock absorbing member mounting portion 73 provided on the carrier plate 12 comes into contact with the stopper main body 51 of the stopper member 18 and absorbs shock, or the configuration may be such that, e.g., the shock absorbing member mounting portion 73 is not provided on the carrier plate 12, neither.

SUMMARY OF THE EMBODIMENTS

Technical ideas understood from the embodiments will be described in (a) to (f) below citing the reference signs, etc., used for the embodiments. However, each reference sign, etc., described below is not intended to limit the constituent elements in the claims to the members, etc., specifically described in the embodiments.

(a) A window regulator (10), comprising: a guide rail (11) provided along an ascending/descending direction of a window glass (2) of a vehicle; a carrier plate (12) that slides on the guide rail (11) and moves together with the window glass (2); a wire (14) that is routed on one side of the guide rail (11) and pulls the carrier plate (12); and a stopper member (18) that is attached on the one side of the guide rail (11) so as to overlap a routing position (14*a*) of the wire (14) and restricts movement of the carrier plate (12) in the ascending/descending direction, wherein the stopper member (18) comprises an attachment portion (52) to attach the stopper member (18) to the guide rail (11) from the one side, and a bypass portion (71) that bypasses the routing position (14*a*) of the wire (14) on a side opposite to the guide rail (11).

(b) The window regulator (10) defined in (a) above, wherein the stopper member (18) comprises a plurality of the attachment portions (52), and wherein the plurality of the attachment portions (52) are arranged so as to sandwich the routing position (14*a*) of the wire (14) in a direction orthogonal to the ascending/descending direction.

(c) The window regulator (10) defined in (a) or (b) above, wherein the attachment portion (52) attaches the stopper member (18) to the guide rail (11) in a snap-fit manner.

(d) The window regulator (10) defined in any one of (a) to (c) above, wherein the stopper member (18) further comprises a shock absorbing member mounting portion (73) to mount a shock absorbing member (72) that absorbs shock when the carrier plate (12) comes into contact with the stopper member (18).

(e) The window regulator (10) defined in (d) above, wherein the shock absorbing member mounting portions (73), two in total, one above and the other below in the ascending/descending direction, are formed on the stopper member (18).

(f) A stopper member attaching method for attaching the stopper member (18) to the guide rail (11) in the window regulator (10) defined in any one of (A) to (E) above, the method comprising: attaching the stopper member (18) to the guide rail (11) from the one side of the guide rail (11) by means of the attachment portion (52).

REFERENCE SIGNS LIST

2 WINDOW GLASS
10 WINDOW REGULATOR
11 GUIDE RAIL
12 CARRIER PLATE
14 DESCENDING-SIDE WIRE
14*a* ROUTING POSITION OF DESCENDING-SIDE WIRE
18 STOPPER MEMBER
52 ATTACHMENT PORTION
71 BYPASS PORTION
72 SHOCK ABSORBING MEMBER
73 SHOCK ABSORBING MEMBER MOUNTING PORTION

The invention claimed is:

1. A window regulator, comprising:

a guide rail provided along an ascending/descending direction of a window glass of a vehicle;

a carrier plate that slides on the guide rail and moves together with the window glass;

a wire to pull the carrier plate;

a rotating drum to which one end of the wire is connected;

a drum housing arranged at a lower end of the guide rail to house the rotating drum; and a stopper member that is formed separately from the drum housing and is arranged above the drum housing, wherein the wire is routed on a front surface in the vehicle width direction of the guide rail, wherein the stopper member is attached directly on the front surface of the guide rail so as to overlap a routing position of the wire and restricts movement of the carrier plate in the ascending/descending direction, and wherein the stopper member comprises an attachment portion to attach the stopper member to the guide rail directly from the front surface in a state in which the drum housing is attached to the guide rail and the wire is routed on the guide rail, and a bypass portion that bypasses the routing position of the wire on the front surface.

2. The window regulator according to claim 1, wherein the stopper member comprises a plurality of the attachment portions, and wherein the plurality of the attachment portions are arranged so as to sandwich the routing position of the wire in a direction orthogonal to the ascending/descending direction.

3. The window regulator according to claim 1, wherein the attachment portion attaches the stopper member to the guide rail in a snap-fit manner.

4. The window regulator according to claim 1, wherein the stopper member further comprises a shock absorbing member mounting portion to mount a shock absorbing member that absorbs shock when the carrier plate comes into contact with the stopper member.

5. A stopper member attaching method for attaching the stopper member to the guide rail in the window regulator according to claim 1, the method comprising:

attaching the stopper member to the guide rail from the front surface of the guide rail by means of the attachment portion.

6. The window regulator according to claim 1, wherein the stopper member comprises a stopper surface that restricts movement of the carrier plate in the ascending/descending direction, and wherein the stopper surface is formed to surround the routing position of the wire.

7. A window regulator, comprising:

a guide rail provided along an ascending/descending direction of a window glass of a vehicle;

a carrier plate that slides on the guide rail and moves together with the window glass;

a wire that is routed on a front side of the guide rail and pulls the carrier plate;

a rotating drum to which one end of the wire is connected;

a drum housing arranged at a lower end of the guide rail to house the rotating drum; and a stopper member that is arranged above the drum housing and is attached on the front side of the guide rail so as to overlap a routing position of the wire and restricts movement of the carrier plate in the ascending/descending direction, wherein the stopper member comprises an attachment portion to attach the stopper member to the guide rail from the front side in a state in which the drum housing is attached to the guide rail and the wire is routed on the guide rail, and a bypass portion that bypasses the routing position of the wire on the front side, wherein the stopper member further comprises a shock absorbing member mounting portion to mount a shock absorbing member that absorbs shock when the carrier plate comes into contact with the stopper member, and wherein the stopper member comprises two shock absorbing member mounting portions, and wherein the two shock absorbing member mounting portions are formed one above and the other below in the ascending/descending direction.

* * * * *